US011927047B1

(12) United States Patent
Thomas

(10) Patent No.: US 11,927,047 B1
(45) Date of Patent: Mar. 12, 2024

(54) DOORWAY TRANSACTION BARRIER

(71) Applicant: Floyd Thomas, Hartford, CT (US)

(72) Inventor: Floyd Thomas, Hartford, CT (US)

( * ) Notice: Subject to any disclaimer, the term of this patent is extended or adjusted under 35 U.S.C. 154(b) by 301 days.

(21) Appl. No.: 17/496,018

(22) Filed: Oct. 7, 2021

(51) Int. Cl.
*E05G 7/00* (2006.01)
*E05G 5/00* (2006.01)

(52) U.S. Cl.
CPC ............. *E05G 7/008* (2013.01); *E05G 5/006* (2013.01); *E05G 7/002* (2013.01)

(58) Field of Classification Search
CPC .. E05G 5/006; E05G 5/02; E05G 7/00; E05G 7/002; E05G 7/004; E05G 7/005; E05G 7/008
See application file for complete search history.

(56) References Cited

U.S. PATENT DOCUMENTS 1,003,116 A 9/1911 Madsen
1,673,601 A * 6/1928 Spottswood ............ E05G 7/007 109/19
2,914,244 A * 11/1959 Wheeler ................. E05G 7/008 312/28
3,059,840 A * 10/1962 Graber .................... E05G 7/008 312/301
3,237,853 A * 3/1966 Grosswiller, Jr. ....... E05G 7/008 109/66
4,061,093 A * 12/1977 Carstens, Jr. ........... E05G 7/002 109/19
4,517,901 A 5/1985 Clark
5,921,191 A * 7/1999 Gabel ..................... E05G 7/005 109/7
6,006,681 A * 12/1999 Brown .................... E05G 7/008 109/19
7,165,595 B2 * 1/2007 Yamamoto ................ E05G 7/00 49/70

* cited by examiner

*Primary Examiner* — Christopher J Boswell
(74) *Attorney, Agent, or Firm* — Sanchelima & Associates, P.A.; Christian Sanchelima; Jesus Sanchelima

(57) ABSTRACT

A doorway transaction barrier including a cabin assembly, a chamber assembly and a mounting assembly is disclosed herein. The cabin assembly includes cabin including a front barrier having a front opening. The front barrier further including a two-way microphone to provide communication between a first user and a second user. The chamber assembly including a front wall, a left wall, a right wall and a top wall. The top wall having the cabin assembly mounted thereon. The front wall including a front door to provide access to a front chamber. The top wall including a second door to provide access to the front chamber from an interior side of the cabin. The top wall further including rails receiving a slidable drawer. The front opening providing access to the drawer. The mounting assembly includes a latch to mount the chamber assembly to a frame door.

9 Claims, 4 Drawing Sheets

DOORWAY TRANSACTION BARRIER

BACKGROUND OF THE INVENTION

1. Field of the Invention

The present invention relates to a transactional door and, more particularly, to a door transaction barrier that includes a barrier to avoid direct human contact.

2. Description of the Related Art

Several designs for transactional doors have been designed in the past. None of them, however, include an upper transparent window and a lower solid portion, the lower solid portion including an access opening with a hinged door.

Applicant believes that a related reference corresponds to U.S. Pat. No. 4,517,901 issued for a through-wall transaction drawer mounted to a cabinet on a cashier's side of a building wall. Applicant believes that another related reference corresponds to U.S. Pat. No. 1,003,116 issued for a window assembly for sales transactions that includes a means of passing items through the window and an opening for communication through the window. None of these references, however, teach of doorway transaction barrier that includes a drawer for monetary transactions and a chamber having a door to avoid contact between the shop keeper and the costumer.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a doorway transaction barrier that includes a drawer for monetary transactions to avoid human contact.

It is another object of this invention to provide a doorway transaction barrier that includes a chamber with a hinged door for access of a costumer to a product.

It is still another object of the present invention to provide a doorway transaction barrier that is easy to mount to a door frame of any kind of store.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
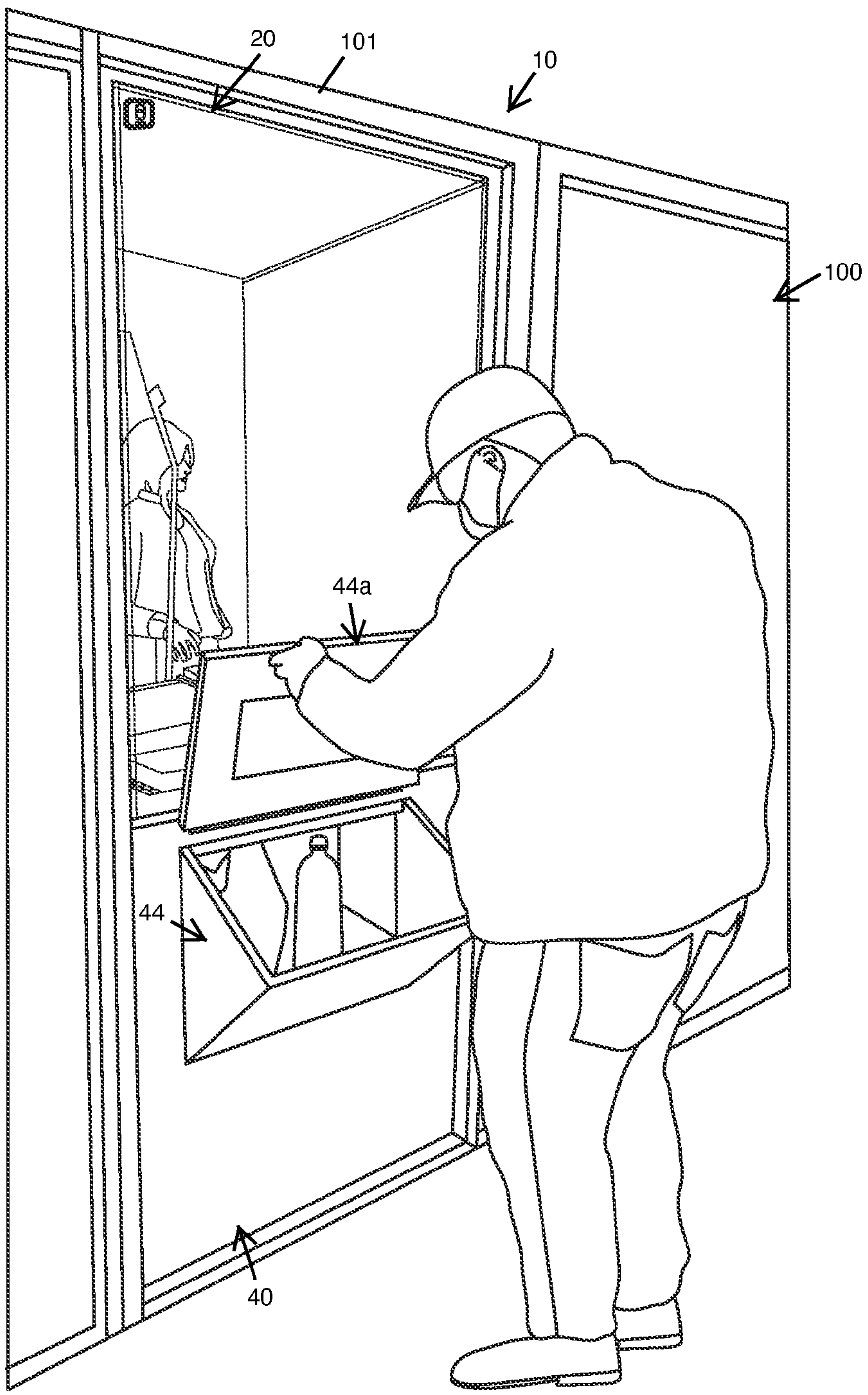
FIG. 1 is an isometric operational view of the present invention 10 showing a first user inside a store assembly 100 and a second user lifting a front door 44*a* to have access to the front chamber 44.
Figure 2:
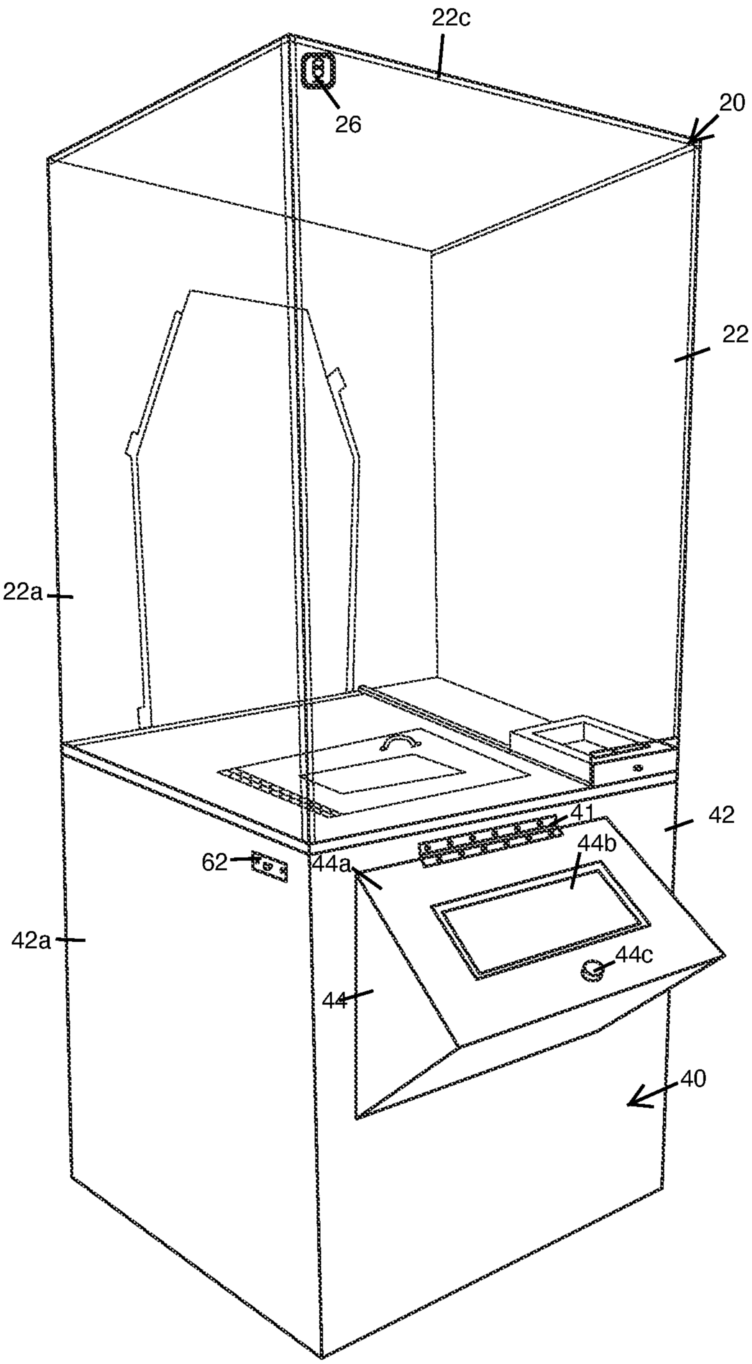
FIG. 2 shows an isometric front view of the present invention 10 a front chamber 44 mounted to a front wall 42, the front door 44*a* is hingedly attached to the front wall 42.

Referring now to the drawings, where the present invention is generally referred to with numeral 10, it can be observed that it basically includes a cabin assembly 20, a chamber assembly 40 and a mounting assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The cabin assembly 20 includes a cabin 21 having a front barrier 22, a left barrier 22*a*, a right barrier 22*b*, a top barrier 22*c*, and a rear barrier 23. The front barrier 22 may have a rectangular shape. The front barrier 22 may be made of a transparent plastic or any other transparent material. The front barrier 22 may be made of a solid material to act as a barrier against a flow of air. The front barrier 22 may have a first opening 24. The first opening 24 may have a rectangular shape. It also may be suitable for the first opening 24 opening to have a shape of an arc, triangle, oval or the like. The first opening 24 may be located on a right portion of a bottom portion of the front barrier 22. It also may be suitable to locate the opening on any other portion of the front barrier 22. The front barrier 22 may include microphone 26. The microphone 26 may be a two-way microphone to allow a better communication between a first user and a second user. The microphone 26 may be located on an upper portion of a left portion of the front barrier 22. It also may be suitable to have a microphone 26 hidden or located anywhere on the front barrier 22 of the cabin 21. The left barrier 22*a* may be perpendicularly attached to a left edge of the front barrier 22. The right barrier 22*b* may be perpendicularly attached to a right edge of the front barrier 22. In one embodiment, the left barrier 22*a* and the right barrier 22*b* may have a rectangular shape. It also may be suitable to have barriers with any other shape. The left barrier 22*a*, the right barrier 22*b*, the front barrier 22 and the rear barrier 23 may have substantially same height. The top barrier 22*c* may be attached to an upper portion of the front barrier 22, left barrier 22*a* and right barrier 22*b*. The top barrier 22*c* may have a shape of a square. It also may be suitable to have a top barrier 22*c* having a circular shape, an oval shape or any other shape. The rear portion 23 may include a third opening 23*a*. The third opening 23*a* may be defined by a couple of lateral cuts having a substantially vertical shape. An upper end of each lateral cut of the couple of lateral cuts may have an inclined cut towards to a substantially horizontal cut. It should be understood that the third opening 23*a* may have any other shape such as a rectangular shape, a squared shape, a circular shape, or any other shape that allows the first user to have access to an interior side of the cabin assembly 20. In one embodiment, the cabin 21 may be made of plexiglass. Other embodiments for the cabin 21 may be made of any transparent material.

The chamber assembly 40 includes a front wall 42, a left wall 42*a*, a right wall 42*b*, a top wall 42*c* and a bottom wall 42*d*. In a preferred embodiment, the front wall 42, the left wall 42*a*, the right wall 42*b* and the top wall 42*c* may be made of melamine. It also may be suitable to make the front wall 42, the left wall 42*a*, the right wall 42*b* and the top wall 42*c* of wood, steel, or any other resistant material. The front wall 42, the left wall 42*a*, the right wall 42*b* and the top wall 42*c* may have substantially a rectangular shape. It also may be suitable to have walls having any other shape. The front wall 42 may have substantially same width than the front barrier 22. The left wall 42*a* may have substantially same width than the left barrier 22*a*. The right wall 42*b* may have substantially same width than the right barrier 22*b*. The top wall 42*c* may have substantially same width and same large than the top barrier 22*c*. The cabin assembly 20 may be mounted on the top wall 42*c*. The front wall 42 may include a front chamber 44 to access to an opening of the front wall 42. The front chamber 44 may be located on a top portion of the front wall 42. The front chamber 44 may include a first lateral portion and a second lateral portion. The first lateral portion and the second lateral portion of the front chamber 44 may have a triangular shape. A first side of the first lateral portion and a first side of the second lateral portion of the front chamber 44 may be perpendicularly attached to the opening of the front wall 42. The front chamber 44 may also include a bottom portion being attached to a second side of the first lateral portion of the chamber 44 and to a second side of the second lateral portion of the front chamber 44. The bottom portion of the front chamber 44 may have a rectangular shape. A top portion of the front chamber 44 may have an opening having a front door 44*a* to close or open the opening of the front chamber 44. The front wall 42 may include hinges 41 to attach the front door 44*a*. The front door 44*a* may allow a second user to have access to the front chamber 44. The front door 44*a* may include a rectangular portion 44*b* on a center area. The Rectangular portion 44*b* may be made of a transparent material such as a transparent plastic. The front door 44*a* may also include a handle 44*c*. The handle 44*c* may have a cylindrical shape. It also may be suitable to have any other kind of handle 44*c*. The handle 44*c* may facilitate the second user to open the front door 44*c*. The handle 44*c* may have any shape.

Figure 3:
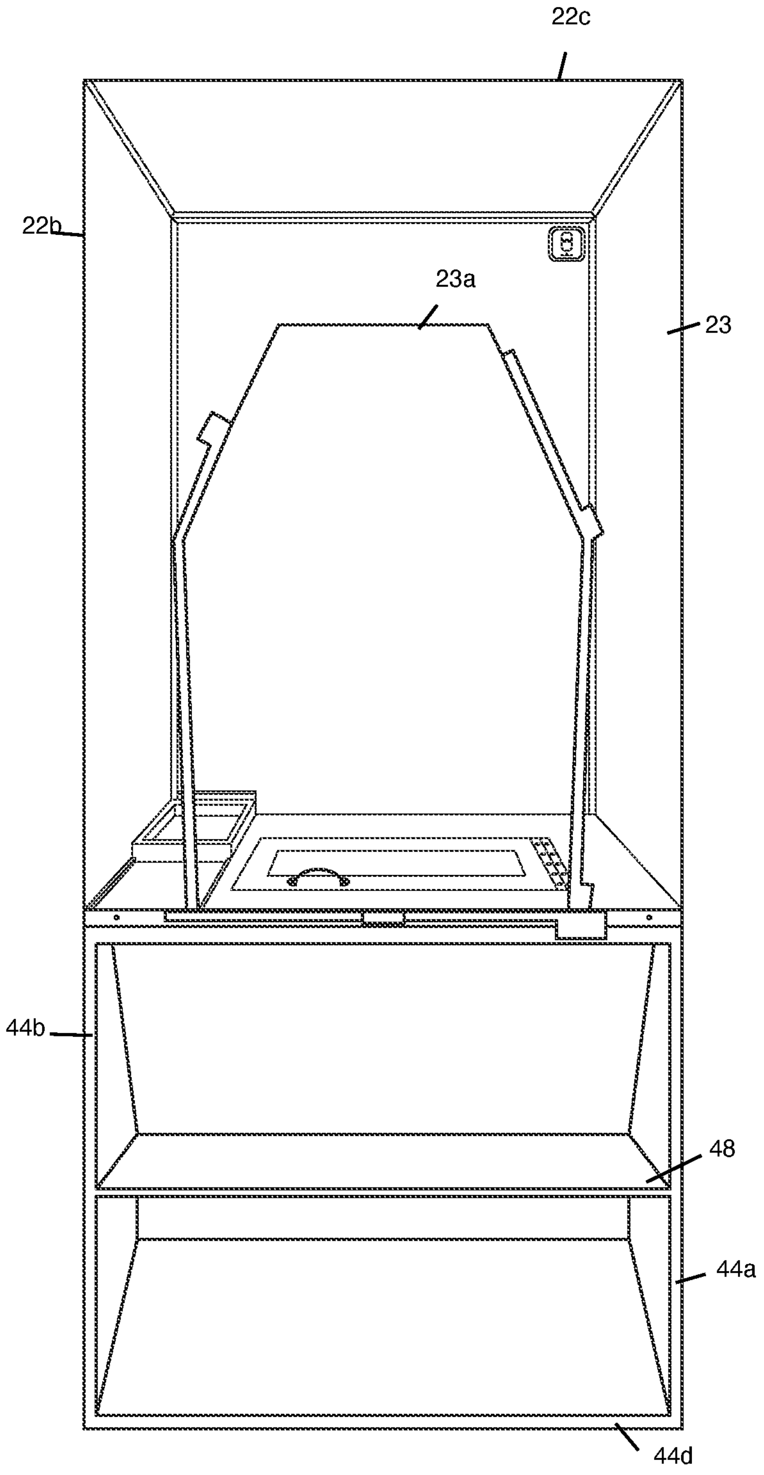
FIG. 3 illustrates a rear view of the present invention 10 showing a shelf 48 mounted to a left wall 42*a*, the front wall 42 and the right wall 42*b*.
Figure 4:
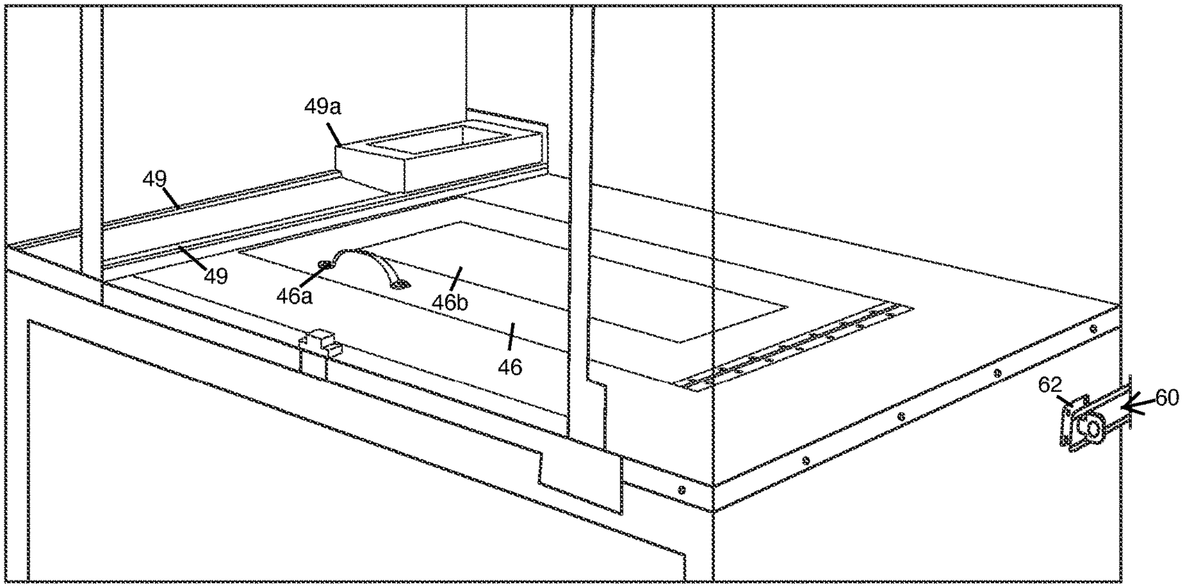
FIG. 4 is a detailed view of a top wall 42*c* of the chamber assembly 40 showing a second door 46 hingedly attached to the top wall 42*c*. a drawer 49*a* is slidably mounted to rails 49.

Referring now to FIG. 3, the chamber assembly 40 may also include a shelf 48. The shelf 48 may have a substantially rectangular flat shape. The shelf 48 may attached to a middle portion of the front wall 42, to a middle portion of the left wall 42*a* and to a middle portion of the right wall 42*b*. The chamber assembly 40 may further include a chamber wall 49 having an inclined shape. Referring now to FIG. 4, a middle portion of the top wall 42*c* may include a second door 46. In a preferred embodiment, the second door 46 may be a hinged door. Other embodiments for the second door 46 may include a slidable door, a roller door, a bifold door, a pivot door, or any other kind of door known in the prior art. A left portion of the second door 46 may include a second handle 46*a*. The second door 46 includes an inner portion 46*b*. The inner portion 46*b* may have a rectangular shape, nonetheless other shapes are suitable. The inner portion 46*b* may be made of a transparent plastic or any other transparent material. A left portion of the top wall 42*c* may include rails 49. The rails 49 may be along an entire width of the top wall 42*c*. A drawer 49*b* may be slidably attached to the rails 49*a*. The drawer 49*a* may have a cuboid shape. The drawer 49*a* may include a third opening to receive items. The drawer 49*a* may have a height slightly smaller than the height of the first opening 24. The drawer 49*a* may have a width slightly smaller than the width of the first opening 24. The drawer 49*a* may carry items from the interior of the cabin assembly 20 to the first opening 24.

The mounting assembly 60 may include a latch 62 attached the chamber assembly 40. The latch 62 may be a magnetic latch, a hinged latch, a screw latch, or any other kind of latches known in the prior art. The latch 62 may attach the present invention 10 to a door frame 101.

Referring now to FIG. 1, the present invention 10 may be mounted to a frame 101 of a store assembly 100. The second user may lift the front door 44*a* to collect items disposed inside the front chamber 44. The first user and the second user may safely interact via the present invention and avoid contact. It should be understood that the present invention 10 may be mounted to any frame of any building that requires a safe transaction barrier.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A doorway transaction barrier, comprising:

a) a cabin assembly including a cabin, said cabin including a front barrier, said front barrier being transparent, wherein said front barrier includes a microphone located on an upper portion of a left portion thereof, said microphone is a two-way microphone configured to provide communication, said cabin including a top door placed on an inner portion thereof;

b) a chamber assembly including a front wall, a top wall and sidewalls, wherein said chamber assembly is made of melamine, wherein the cabin is mounted on the top wall, the front wall having a front chamber attached thereon, said front chamber including a front door to access to an opening of said front wall, wherein said front chamber has a scalene triangle profile, said front chamber having lateral chamber sides, a bottom chamber side and a top chamber side, wherein said top chamber side has a length smaller than a length of said bottom chamber side, wherein said front door is placed on said top chamber side, wherein a rear edge of said top chamber side is hingedly attached to said front wall, said front door and said top door are operatively connected, wherein said front door and said top door are hingedly attached doors, wherein said top wall includes rails extending a length thereof, wherein a drawer having sidewalls and a bottom wall is slidable attached to said rails; and c) a mounting assembly including a latch, wherein said latch attaches the chamber assembly to a frame door.

2. The doorway transaction barrier of claim 1, wherein said cabin assembly further includes a left barrier, a right barrier and a top barrier.

3. The doorway transaction barrier of claim 1, wherein said cabin assembly includes a rear barrier, wherein said barrier includes an opening to provide access to an interior side of the cabin.

4. The doorway transaction barrier of claim 1, wherein said cabin is made of plexiglass.

5. The doorway transaction barrier of claim 1, wherein said front door includes a handle.

6. The doorway transaction barrier of claim 1, wherein said front wall includes a front opening having a rectangular shape, wherein said front opening provides access to said drawer.

7. The doorway transaction barrier of claim 1, wherein said top door provides access to the front chamber from inside the cabin, said top door having a second handle.

8. The doorway transaction barrier of claim 1, wherein said chamber assembly further includes a shelf, said shelf located between said left wall, said right wall and said front wall.

9. A doorway transaction barrier, consisting of:

a) a cabin assembly including a cabin, said cabin including a front barrier, a left barrier, a top barrier, a right barrier and a rear barrier, wherein said rear barrier has an opening to provide access to an interior side of the cabin, said front barrier including a two-way microphone located on an upper portion of a left portion thereof, said front barrier including a front opening located on a bottom portion of the front side, said front opening having a rectangular shape, said cabin being transparent, said cabin being made of plexiglass;

b) a chamber assembly including a front wall, a top wall and sidewalls, located on an upper portion of a left portion thereof, wherein the cabin is mounted on the top wall, the front wall having a front chamber attached thereon, wherein said front chamber includes a front door to access to an opening of said front wall, wherein said front chamber has a scalene triangle profile, said front chamber having lateral chamber sides, a bottom chamber side and a top chamber side, wherein said top chamber side has a length smaller than a length of said bottom chamber side, wherein said front door is placed on said top chamber side, wherein a rear edge of said top chamber side is hingedly attached to said front wall, said front door and said top door are operatively connected, wherein said front door and said top door are hingedly attached doors, wherein said top wall includes rails extending a length thereof, wherein a drawer having sidewalls and a bottom wall is slidable attached to said rails, said drawer having a cuboid shape and being exposed on said top wall, said front door being a hinged door, said front door includes a handle, said front door includes an inner portion being rectangular and transparent, said chamber assembly further including a shelf, said shelf located between said left wall, said right wall and said front wall, said chamber assembly being made of melamine; and c) a mounting assembly including a latch, wherein said latch attaches the chamber assembly to a frame door.

* * * * *